US012787950B2

(12) United States Patent
Erwin et al.

(10) Patent No.: US 12,787,950 B2
(45) Date of Patent: Nov. 10, 2026

(54) TREE GRUBBER IMPLEMENT FOR A SKID STEER

(71) Applicants: Henry Pat Erwin, Cooper, TX (US); Calvin Farr, Callisburg, TX (US)

(72) Inventors: Henry Pat Erwin, Cooper, TX (US); Calvin Farr, Callisburg, TX (US)

( * ) Notice: Subject to any disclaimer, the term of this patent is extended or adjusted under 35 U.S.C. 154(b) by 645 days.

(21) Appl. No.: 18/112,499

(22) Filed: Feb. 21, 2023

(65) Prior Publication Data

US 2023/0276751 A1 Sep. 7, 2023

Related U.S. Application Data

(60) Provisional application No. 63/317,531, filed on Mar. 7, 2022.

(51) Int. Cl.
*A01G 23/06* (2006.01)

(52) U.S. Cl.
CPC .................................. *A01G 23/065* (2013.01)

(58) Field of Classification Search
None
See application file for complete search history.

(56) References Cited

U.S. PATENT DOCUMENTS

| | | | | |
|---|---|---|---|---|
| 3,344,540 A | | 10/1967 | Ulrich | |
| 5,067,261 A | * | 11/1991 | Betts | A01G 23/06 172/698 |
| 5,490,340 A | * | 2/1996 | Muncy | A01B 13/00 172/698 |
| 6,360,459 B1 | * | 3/2002 | Brookhart | E02F 3/345 37/234 |
| 6,698,478 B2 | | 3/2004 | Nault | |
| 6,763,618 B1 | | 7/2004 | Moran | |
| 7,415,999 B1 | | 8/2008 | Price et al. | |
| 7,610,698 B2 | | 11/2009 | May | |
| 7,913,431 B1 | | 3/2011 | Beam et al. | |
| 8,561,325 B1 | | 10/2013 | Hegener et al. | |
| 9,648,796 B1 | * | 5/2017 | Tschetter | A01B 43/00 |
| 9,661,806 B2 | | 5/2017 | Rushing | |
| 10,294,631 B2 | | 5/2019 | Haveman | |
| 2002/0104237 A1 | | 8/2002 | Chaney | |
| 2003/0031547 A1 | | 2/2003 | Stumvoll et al. | |
| 2003/0230419 A1 | | 12/2003 | Eubanks | |
| 2008/0011496 A1 | | 1/2008 | Garrison et al. | |
| 2008/0016725 A1 | | 1/2008 | Boehm | |
| 2009/0194300 A1 | | 8/2009 | Oberg | |
| 2014/0250741 A1 | * | 9/2014 | Simmons | A01G 23/062 37/302 |

* cited by examiner

*Primary Examiner* — Christopher J Sebesta
*Assistant Examiner* — Alfred H Tsui
(74) *Attorney, Agent, or Firm* — Fulton Jeang PLLC

(57) ABSTRACT

A tree grubber implement for secure releasable attachment to a powered mobile vehicle such as skid steer includes a mounting plate having a configuration for attachment to the vehicle, an arm having a proximate end coupled to the mounting plate, and a foot coupled at an angle to a distal end of the arm. The foot has at least two spaced apart claws extending substantially downwardly and inwardly toward the vehicle.

20 Claims, 7 Drawing Sheets

TREE GRUBBER IMPLEMENT FOR A SKID STEER

CROSS-REFERENCE TO RELATED APPLICATION

This patent application claims the benefit of U.S. Provisional Patent Application No. 63/317,531 filed on Mar. 7, 2022, which is incorporated herein by reference in its entirety.

TECHNICAL FIELD

This disclosure relates to an implement attachment for farm, ranch, and earthmoving equipment, such as a skid steer, skid loader, or front loader. More specifically, the present disclosure relates to a tree grubber implement for attachment with a skid steer to easily rip the soil and uproot vegetation such as trees and shrubs.

BACKGROUND OF THE DISCLOSURE

A skid steer (also commonly referred to as a skid steer loader) is a compact vehicle that is commonly used for agricultural or construction work to move materials. Because of their smaller size and lower price point, skid steers are popular workhorses for many applications in a variety of settings.

In their most common configuration, skid steers travel on wheels that are driven hydraulically. Some skid steers are outfitted with tracks so that they have improved traction to enable them to traverse difficult terrain. Skid steer vehicles commonly have at least one loader lift arm that is pivotally coupled to the chassis of the vehicle to raise and lower at the operator's command. This arm typically has a bucket, blade, or another implement attached to the end of the arm that can be lifted and lowered. The bucket is the most common tool attached to the arm of the skid steer vehicle used to carry supplies or particulate matter such as gravel, sand, or dirt around a worksite. To enable these tools to be easily and quickly interchangeable, standard tool implement engagement mechanisms have been developed.

DESCRIPTION OF THE FIGURES

The accompanying drawings facilitate an understanding of the various embodiments.

DETAILED DESCRIPTION

Figure 1:
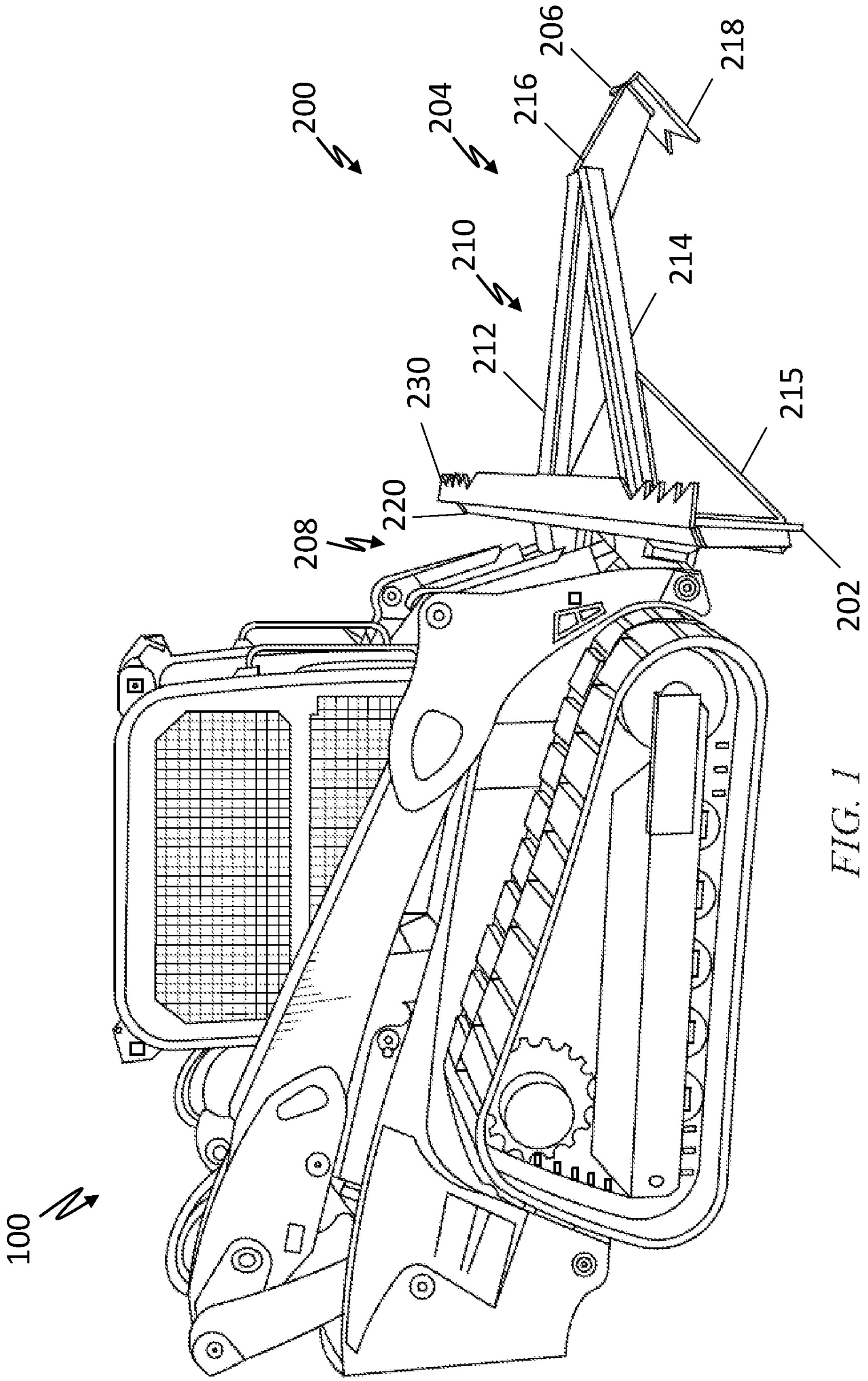
FIG. 1 is a side perspective view of an example embodiment of a tree grubber implement shown attached to a skid steer in the lowered and retracked position according to the teachings of the present disclosure.

Referring to FIGS. 1-7 for various views of an example embodiment of a tree grubber implement 200 for attachment to and operation with a powered vehicle or mobile machinery 100 such as a skid steer, skid loader, or front end loader. The tree grubber implement 200 includes three main components: a mounting plate 202, an arm 204, and a foot 206. The mounting plate 202 is a substantially rectangular metal plate adapted for secure attachment and engagement to a standard coupling mechanism 208 located at the front end of a vehicle or machine such as a skid steer 100. In an alternate embodiment, the mounting plate 202 may be a substantially rectangular mounting frame instead of a solid plate configuration shown in the figures. Attached to the mounting plate 202 is an arm 204 that includes a boom 210 and a stick 216. The boom has an upper segment 212 and a lower segment 214 forming a generally triangular configuration with the mounting plate 202. The upper and lower segments of the boom 210 are joined with the stick 216 at obtuse angles. Further included are two triangular-shaped lateral brace members 215 coupled between the lower edge of the mounting plate 202 and the lower boom segment 214. The lateral brace members 215 provide additional structural integrity and strength to the arm 204. The stick 216 is attached to and extends from the distal ends of the upper and lower arm segments 212 and 214 and its distal end is attached to the foot 206. The foot 206 forms a generally L-shaped downward or inward-oriented configuration with the stick 216. However, the fixed angle between the stick 216 and the foot 206 can be an acute angle, an obtuse angle, or a right angle. The fixed angle between the stick 216 and the foot 206 is preferably with the range of about 60-120 degrees. The foot 206 preferably includes two claws 218 with sharp pointy ends that are spaced apart. As shown in the figures, the claws 218 may be fabricated from a metal plate and be generally triangular-shaped, however, the claws 218 can have any suitable alternate shape and construction.

It should be noted that although the joints and the angular orientation between the boom 210, stick 216, and foot 206 are fixed in the embodiment shown in the figures, it is anticipated that these joints can be articulated and their angles can be controllable by the operator to enable additional ranges of motion. However, by keeping the implement component joinery simple and fixed, the overall cost of the tree grubber implement 200 can be kept lower and affordable.

Figure 6:
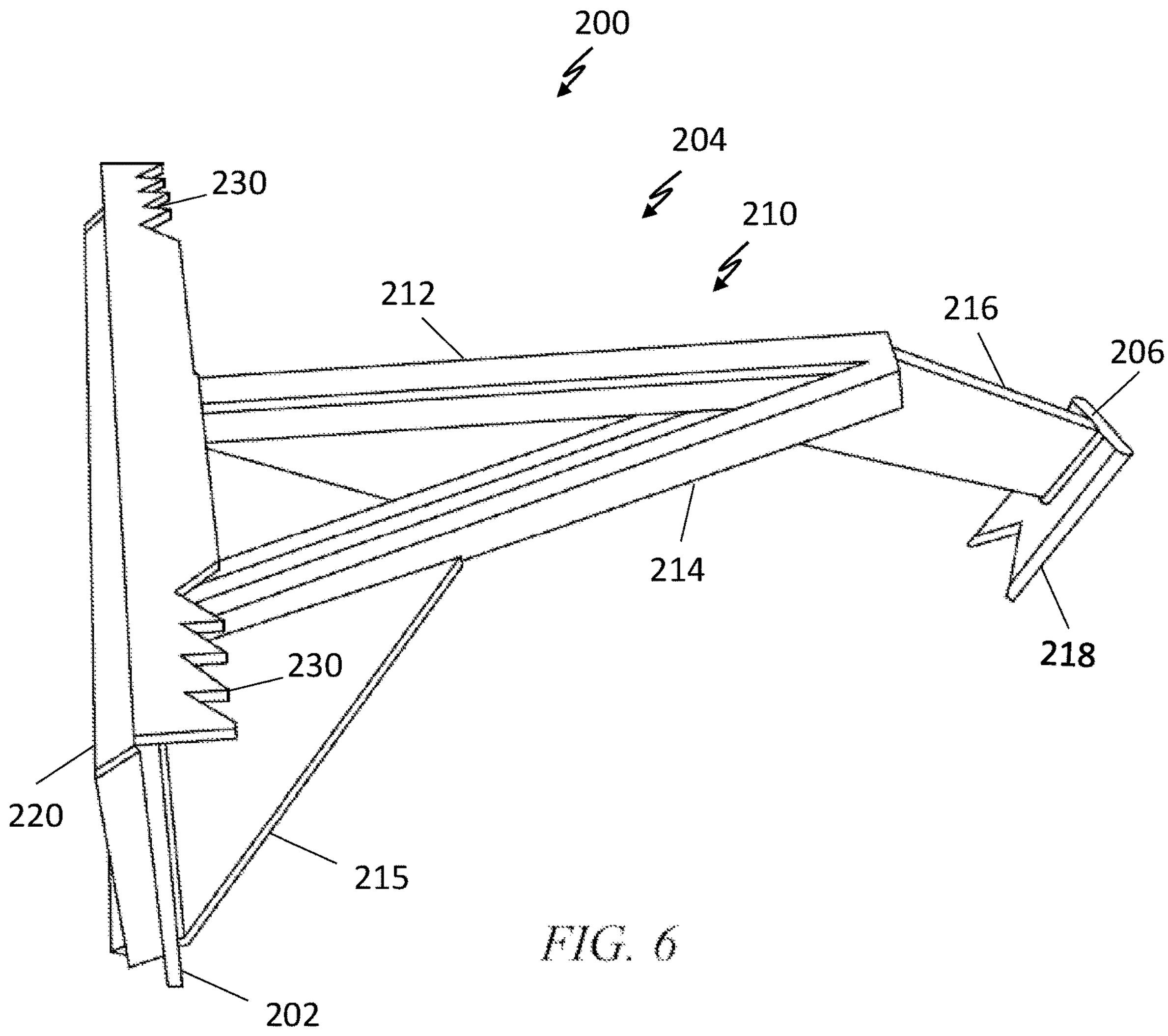
FIG. 6 is an additional side view of an example embodiment of a tree grubber implement for use with a skid steer according to the teachings of the present disclosure.
Figure 7:
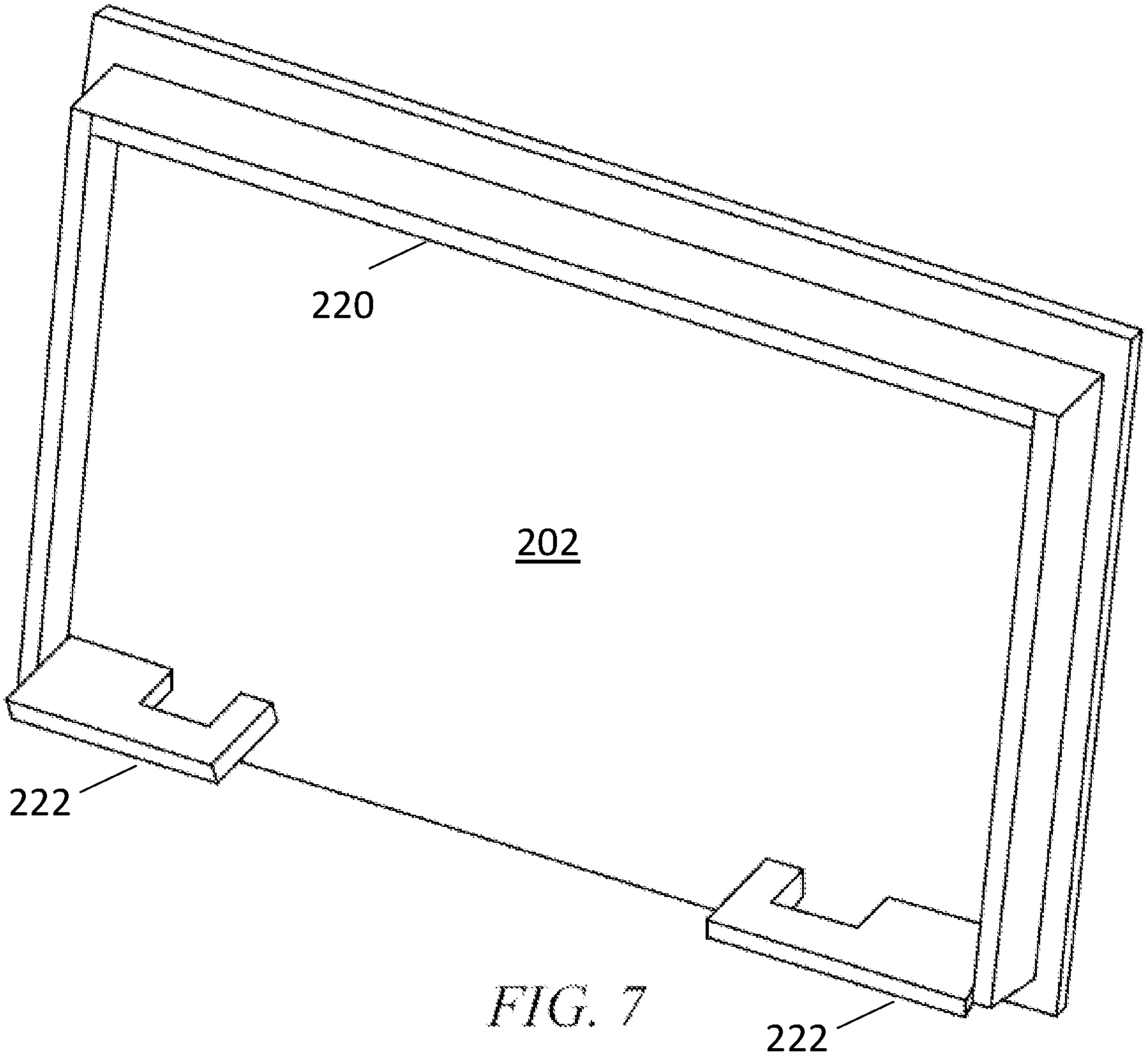
FIG. 7 is a perspective view of an example embodiment of the mounting plate construction configured for engaging a standard coupling mechanism according to the teachings of the present disclosure.

As shown in FIGS. 6 and 7, the mounting plate 202 has a horizontally-oriented but downward-angled lip or flange 220 forming a lateral pocket that a standard locking plate or attachment shoe at the front end of the skid steer 100 may engage to provide secure attachment of the implement 200 to the skid steer 100. The mounting plate 202 further includes horizontal attachment members 222 located at or near the bottom edge that enable secure engagement of attachment pins of the skid steer 100. The mounting plate 202 is configured to engage standard coupling mechanisms 208 of the mobile machinery such as the skid steer and skid loader that enables secure and quick-releasable attachment of the tree grubber implement 200.

Located along the upper edge of the mounting plate 202 is one or more series of forward or outward facing (e.g., extending toward the foot) serrated teeth 230. In the embodiment shown, these teeth 230 are arranged horizontally along the two upper outer corners of the mounting plate 202.

Figure 2:
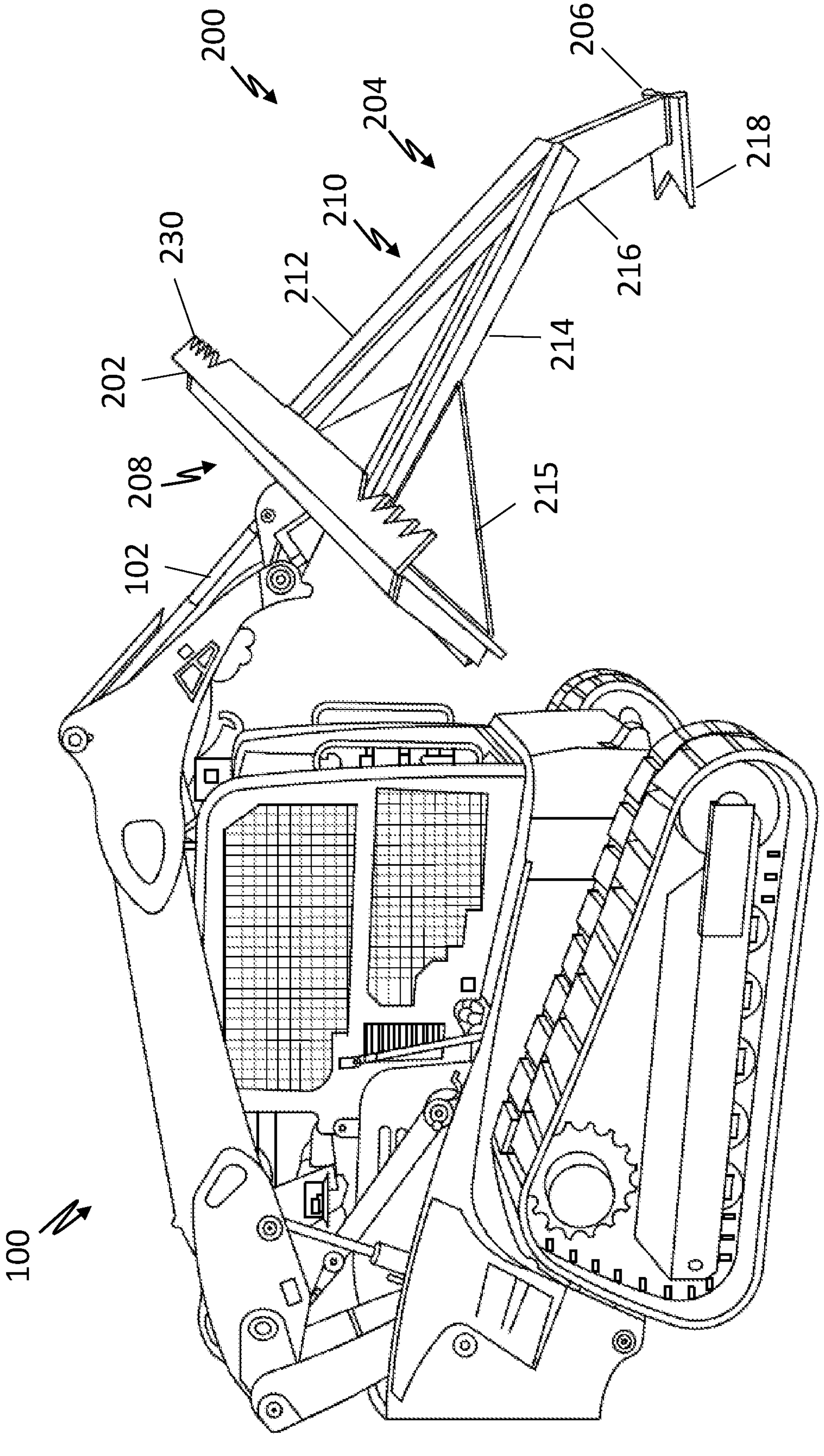
FIG. 2 is another side perspective view of an example embodiment of a tree grubber implement shown attached to a skid steer in the raised and extended position according to the teachings of the present disclosure.
Figure 3:
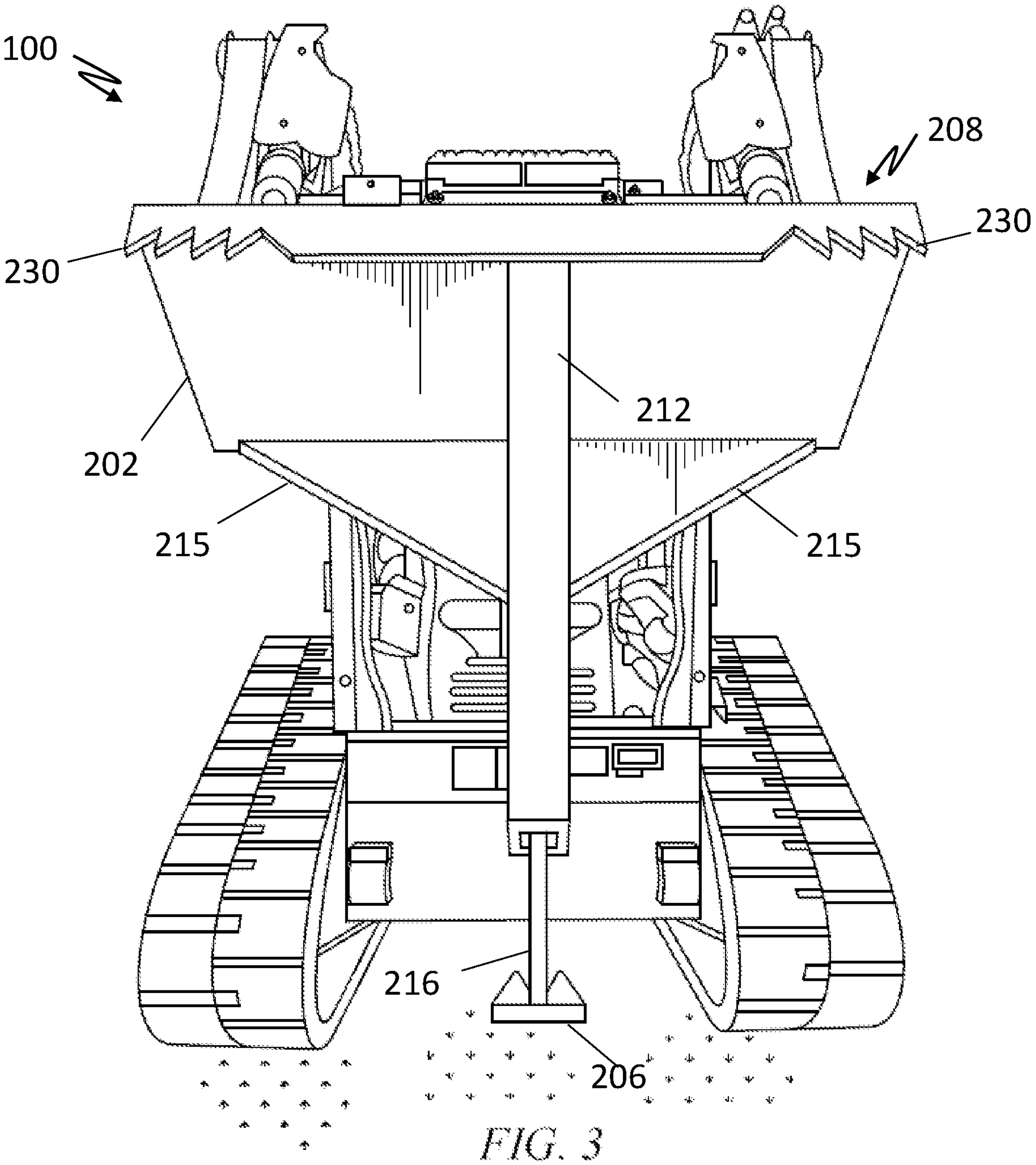
FIG. 3 is a front view of an example embodiment of a raised tree grubber implement shown attached to a skid steer according to the teachings of the present disclosure.
Figure 4:
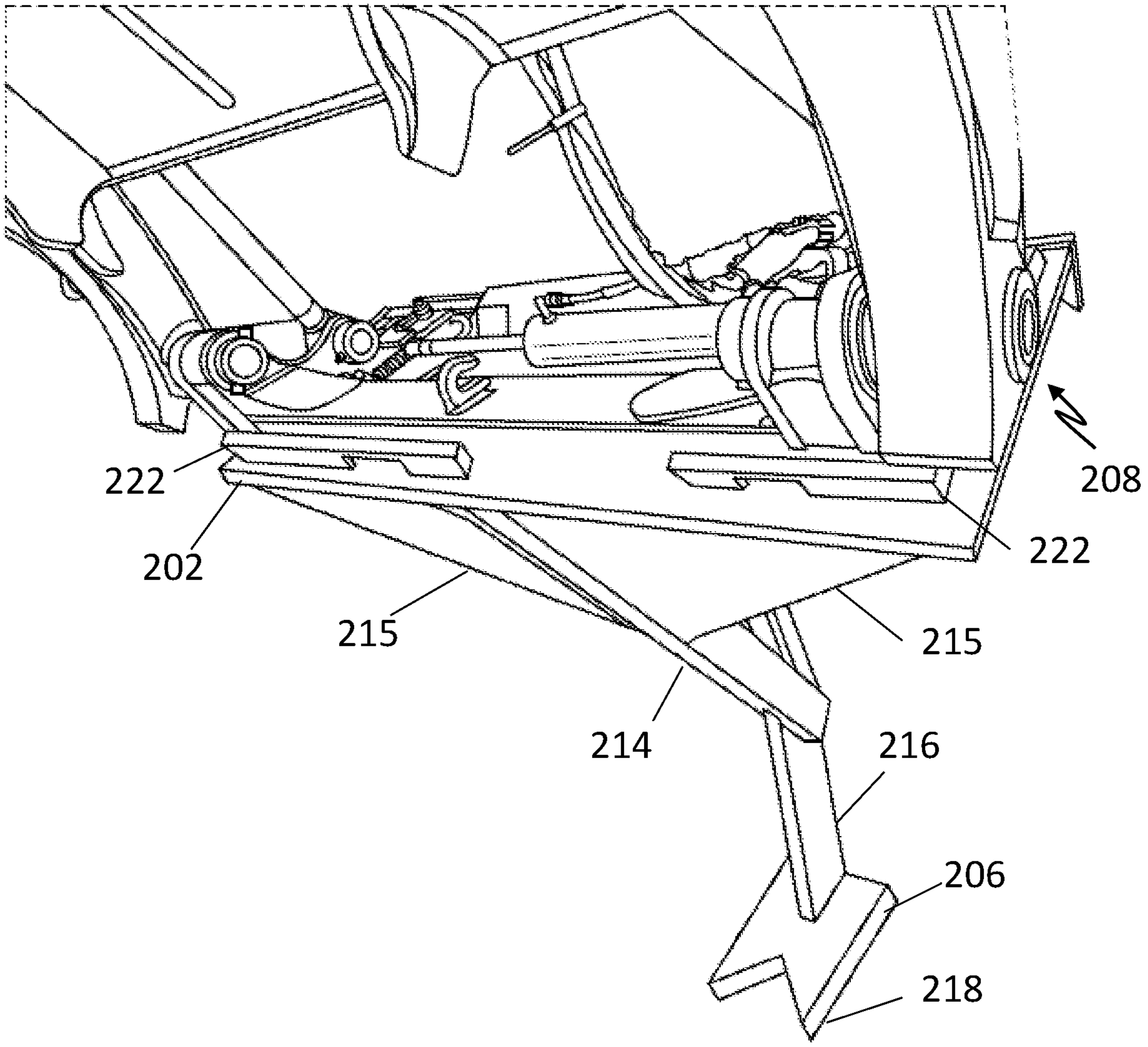
FIG. 4 is a bottom perspective view of an example embodiment of a tree grubber implement for use with a skid steer according to the teachings of the present disclosure.
Figure 5:
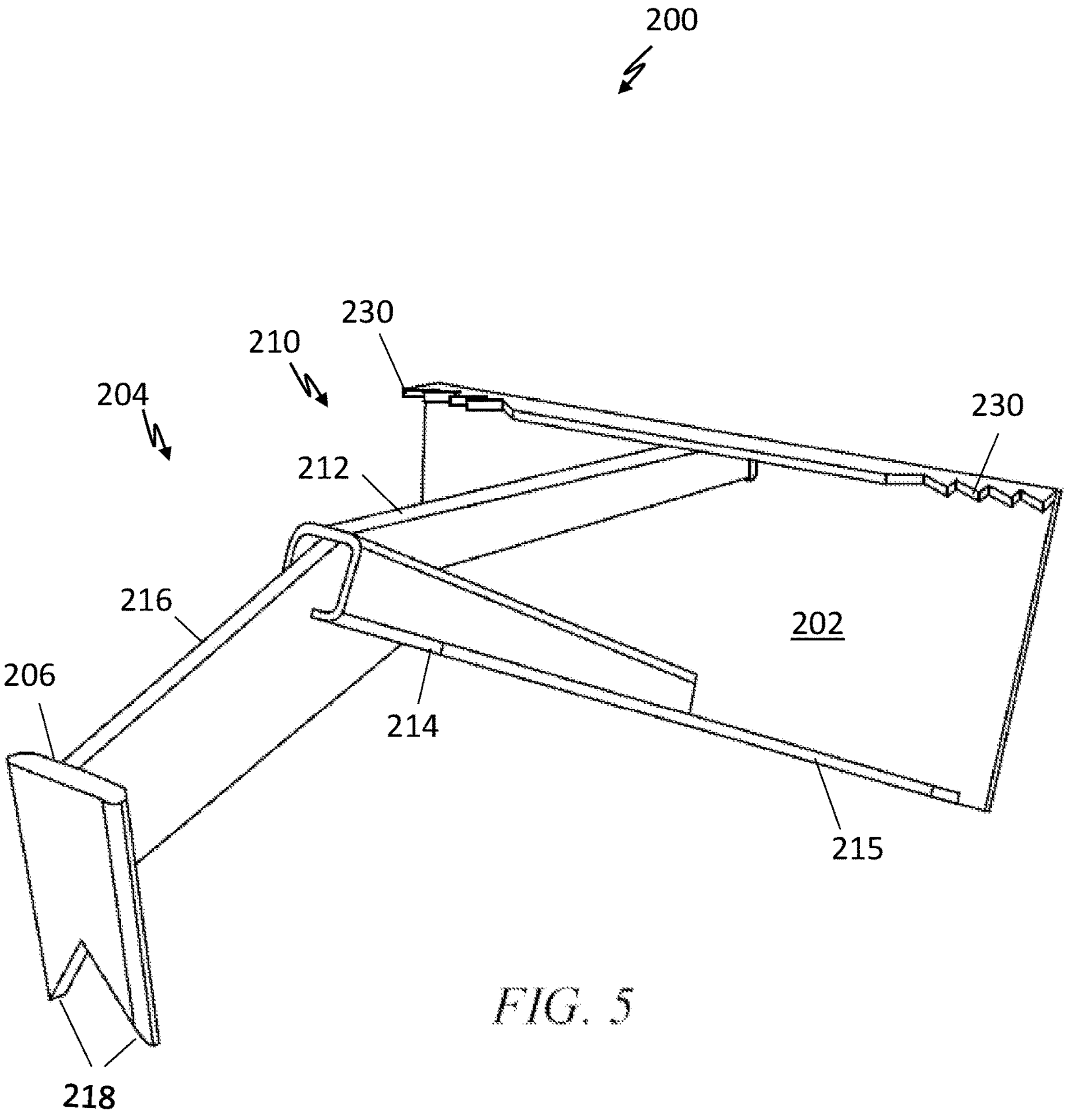
FIG. 5 is a front perspective view of an example embodiment of a tree grubber implement for use with a skid steer according to the teachings of the present disclosure.

Actuators of the machinery 100 such as the skid steer shown in the figures, such as boom and/or bucket hydraulic cylinders 102, engage the mounting plate 202 of the implement 200 via the aforementioned standard coupling mechanism. In operation, the user, by operating the skid steer controls to operate the boom and/or bucket hydraulic cylinders 102 of the skid steer 100, the user can raise, lower, and pivot the implement 200. These actions enable the user to change the angle of the foot 206 (and its claws 218) with respect to the vehicle (and ground). For example, FIG. 1 shows the tree grubber implement 200 in the lowered and retracked position, and FIG. 2 shows the tree grubber implement 200 in the raised and extended position.

It may be seen that the length of the arm 204 enables the implement 200 to have farther extended reach. More than one version of the implement with differing arm lengths may be fabricated and made available for different applications. In operation, the user may operate the boom and/or bucket hydraulic cylinders so that the claws 218 of the foot 206 can be passed along the contours of the terrain to rake, scrape, and rip the dirt and roots or clear low-growing brush, and the foot 206 (and the claws 218) can be used to push or pull on tree trunks and shrubs to uproot the vegetation. The claws 218 can even be used to pick up and move tree trunks of certain diameters and other vegetation. Additionally, the user may maneuver the angle and position of the mounting plate 202 to use the serrated teeth 230 positioned along its upper edge to clear and move vegetation.

Because powered vehicles like skid steers, skid loaders, and front end loaders are powerful, light, and compact machines that are easily maneuverable into tight spaces, they are especially suited as the base machinery using the tree grubber implement 200. The main standard components of skid steer loaders include an operator's cab, a diesel or gasoline engine, hydraulic pumps, hydraulic cylinders and pistons, hydrostatic transmission, and a pair of lift arms. Because of the easy maneuverability and the small size of the skid steer, the tree grubber implement 200 described herein allows it to be used navigate in cramped spaces to clear brush and uproot and remove trees and other unwanted vegetation.

The features of the present invention which are believed to be novel are set forth below with particularity in the appended claims. However, modifications, variations, and changes to the exemplary embodiments described above will be apparent to those skilled in the art, and the tree grubber implement described herein thus encompasses such modifications, variations, and changes and are not limited to the specific embodiments described herein.

What is claimed is:

1. A tree grubber implement for secure releasable attachment to a skid steer, comprising:
- a mounting plate having a substantially planar configuration for releasable attachment to a front end of the skid steer;
- an elongated arm having a proximal end coupled to the mounting plate, the arm extending substantially perpendicularly outward from the substantially planar configuration of the mounting plate; and
- a foot coupled at a fixed angle to a distal end of the arm, the elongated arm providing the foot an extended reach substantially perpendicularly outward from the mounting plate, the foot having at least two spaced apart claws extending substantially downwardly and inwardly toward the skid steer.

2. The tree grubber implement of claim 1, further comprising first and second lateral brace members joining the arm to the mounting plate.

3. The tree grubber implement of claim 1, wherein the arm comprises a boom and a stick joined at a fixed angle.

4. The tree grubber implement of claim 1, wherein the arm comprises a boom and a stick joined at an obtuse angle.

5. The tree grubber implement of claim 3, wherein the boom comprises an upper segment and a lower segment having their proximal ends being spaced apart and coupled to the mounting plate, and their distal ends being coupled to a proximal end of the stick.

6. The tree grubber implement of claim 5, further comprising first and second triangular-shaped lateral brace members joining the distal end of the lower segment of the boom to the mounting plate.

7. The tree grubber implement of claim 1, wherein the at least two spaced apart claws of the foot are oriented at a fixed angle of about 60-120 degrees relative to the stick.

8. The tree grubber implement of claim 1, wherein the tree grubber implement is configured to be oriented and positioned by retracting and extending at least one hydraulic cylinder of the skid steer.

9. The tree grubber implement of claim 1, wherein the mounting plate and foot of the tree grubber implement are configured to be oriented and positioned by retracting and extending at least one hydraulic cylinder of the skid steer.

10. The tree grubber implement of claim 1, wherein an upper edge of the mounting plate comprises at least one series of outward facing serrated teeth extending toward the foot.

11. The tree grubber implement of claim 4, wherein joints between the boom, stick, and foot are configured to be articulated to enable ranges of motion.

12. An implement attachment for a powered vehicle having a longitudinal axis and a standard implement engagement mechanism, comprising:
- a mounting plate having a configuration for releasable attachment to the standard implement engagement mechanism of the powered vehicle;
- an elongated boom and an elongated stick joined at a fixed angle, a proximal end of the boom being coupled to the mounting plate, and the elongated boom and stick extending substantially perpendicularly outward along the longitudinal axis of the powered vehicle away from the mounting plate; and
- a foot coupled at a fixed angle to a distal end of the stick, the elongated arm providing the foot an extended reach, the foot having at least one pointed claw extending substantially downwardly and inwardly toward the powered vehicle.

13. The implement attachment of claim 12, further comprising first and second lateral brace members joining the stick to the mounting plate.

14. The implement attachment of claim 12, wherein the boom comprises an upper segment and a lower segment having their proximal ends being spaced apart and coupled to the mounting plate, and their distal ends being coupled to a proximal end of the stick.

15. The implement attachment of claim 12, wherein the foot comprises at least two spaced apart claws that are oriented at a fixed angle of about 60-120 degrees relative to the stick.

16. The implement attachment of claim 12, wherein an upper edge of the mounting plate comprises at least one series of outward facing serrated teeth extending toward the foot.

17. A vegetation clearing implement for engagement with a powered loader having a longitudinal axis, comprising:

a mounting plate having a configuration for releasable attachment to a standard implement engagement mechanism of the powered loader;

a boom and a stick joined at a fixed angle, and a proximal end of the boom being coupled to the mounting plate;

an elongated boom and an elongated stick joined at a fixed angle, a proximal end of the boom being coupled to the mounting plate, and the elongated boom and stick substantially perpendicularly outward along the longitudinal axis of the powered loader from the mounting plate;

at least one lateral brace member joining the stick to the mounting plate;

a foot coupled at a fixed angle to a distal end of the stick, the elongated boom and stick providing the foot an extended reach, the foot having at least one pointed claw extending substantially downwardly and inwardly toward the skid steer.

18. The implement of claim 17, wherein the boom comprises an upper segment and a lower segment having their proximal ends being spaced apart and coupled to the mounting plate, and their distal ends being coupled to a proximal end of the stick.

19. The implement of claim 17, wherein the boom and stick are joined at an obtuse angle, and the foot is oriented at about 60-120 degrees relative to the stick.

20. The implement of claim 17, wherein an upper edge of the mounting plate comprises at least one series of outward facing serrated teeth extending toward the foot.

* * * * *